(12) United States Patent
Balasubramanian et al.

(10) Patent No.: US 9,405,962 B2
(45) Date of Patent: Aug. 2, 2016

(54) METHOD FOR ON-THE-FLY LEARNING OF FACIAL ARTIFACTS FOR FACIAL EMOTION RECOGNITION

(71) Applicant: Samsung Electronics Co., Ltd., Suwon-si (KR)

(72) Inventors: Anand Balasubramanian, Bangalore (IN); Velusamy Sudha, Bangalore (IN); Gopalakrishnan Viswanath, Bangalore (IN); Sharma Anshul, Bangalore (IN); Moogi Pratibha, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 44 days.

(21) Appl. No.: 13/904,225

(22) Filed: May 29, 2013

(65) Prior Publication Data

US 2014/0050408 A1    Feb. 20, 2014

(30) Foreign Application Priority Data

Aug. 14, 2012  (IN) ............................ 3357/CHE/2012
Oct. 12, 2012  (KR) ........................ 10-2012-0113389

(51) Int. Cl.
*G06K 9/46*    (2006.01)
*G06K 9/00*    (2006.01)

(52) U.S. Cl.
CPC ........ *G06K 9/00281* (2013.01); *G06K 9/00315* (2013.01)

(58) Field of Classification Search
None
See application file for complete search history.

(56) References Cited

U.S. PATENT DOCUMENTS

| | | | |
|---|---|---|---|
| 6,879,709 B2* | 4/2005 | Tian | G06K 9/00308 340/5.83 |
| 8,165,399 B2* | 4/2012 | Kaneda | G06K 9/00248 382/118 |
| 2004/0017930 A1* | 1/2004 | Kim | G06K 9/00228 382/103 |
| 2005/0123202 A1* | 6/2005 | Hwang | G06K 9/6235 382/224 |
| 2008/0205772 A1* | 8/2008 | Blose | G06K 9/00711 382/225 |
| 2010/0086215 A1 | 4/2010 | Bartlett et al. | |
| 2012/0121142 A1* | 5/2012 | Nagesh | 382/118 |
| 2012/0288166 A1* | 11/2012 | Sun | G06K 9/00281 382/118 |

FOREIGN PATENT DOCUMENTS

| | | |
|---|---|---|
| JP | 2005-293539 | 10/2005 |
| JP | 2010-271872 | 12/2010 |
| KR | 10-2000-0023915 | 5/2000 |
| KR | 10-2001-0030013 | 4/2001 |
| KR | 10-2005-0007688 | 1/2005 |
| KR | 10-2009-0093223 | 9/2009 |
| KR | 10-2010-0081874 | 7/2010 |

OTHER PUBLICATIONS

Dai, Yang. 1999. Recognition of facial expressions based on the Hopfield memory model. IEEE International Conference on Multimedia Computing and Systems. vol. 2; pp. 133-137.*

* cited by examiner

*Primary Examiner* — Utpal Shah
*Assistant Examiner* — Mai Tran
(74) *Attorney, Agent, or Firm* — NSIP Law

(57) ABSTRACT

A method for determining a facial emotion of a user in the presence of a facial artifact includes detecting Action Units (AUs) for a first set of frames with the facial artifact; analyzing the AUs with the facial artifact after the detection; registering the analyzed AUs for a neutral facial expression with the facial artifact in the first set of frames; predicting the AUs in a second set of frames; and determining the facial emotion by comparing the registered neutral facial expression with the predicted AUs in the second set of frames.

15 Claims, 4 Drawing Sheets

METHOD FOR ON-THE-FLY LEARNING OF FACIAL ARTIFACTS FOR FACIAL EMOTION RECOGNITION

CROSS-REFERENCE TO RELATED APPLICATIONS

This application claims the priority benefit of Indian Patent Application No. 3357/CHE/2012, filed on Aug. 14, 2012, in the Indian Patent Office, and Korean Patent Application No. 10-2012-0113389, filed on Oct. 12, 2012, in the Korean Intellectual Property Office, the disclosures of which are incorporated herein by reference.

BACKGROUND

1. Field

The following description relates to image processing, and more particularly, to facial emotion recognition systems.

2. Description of the Related Art

The ability to interpret emotions is very important for effective communication. For ideal human computer interfaces (HCI), it is desired that machines have robust facial emotion recognition system. Emotion recognition from facial expressions is a well studied field that uses Facial Action Coding System (FACS). The FACS is a system to taxonomize human facial expressions. FACS human coders can manually code nearly any anatomically possible facial expression, further deconstructing it into the specific Action Units (AU) and their temporal segments that produced the expression. In order to build a robust facial emotion recognition system subtle expression, head pose, talking faces, illumination conditions, and occlusions have to be handled. Existing facial emotion recognition systems perform facial emotion recognition but have limitations and fall short while recognizing facial emotions with facial artifacts such as eyeglasses, facial hair, scars, birth marks, wrinkles, and so on.

Occlusions in the presence of accessories (glasses, beards, and so on) to some extent are inherently handled using fiducial point approaches where an emotion is concluded using geometric patterns from the eyes, eyebrows, and mouth region. The disadvantage of geometrical pattern technique is the sensitivity to scaling and rotation of a face in the image plane and therefore would not be robust. Facial variations, artifacts, or facial biases may cause the features that characterize a face to be distorted. It is desirable to identify problematic facial artifacts that may cause false identification or no identification. External facial variations may be due to illumination, head pose, scale, and translation, while internal facial variations may be due to hair color, hair style, makeup, moustache, beard, and eyeglasses, as well as facial variations which stem from the user itself. Facial artifacts in the vicinity of facial muscles, Action Units (AU), will result in an incorrect analysis of emotion.

Due to abovementioned reasons, existing systems fails to recognize facial emotions in the presence of facial artifacts or occlusions to provide a robust facial expression based emotion recognition system.

SUMMARY

Additional aspects and/or advantages will be set forth in part in the description which follows and, in part, will be apparent from the description, or may be learned by practice of the invention.

The following description relates to a method and system which enables facial emotion recognition in presence of facial artifacts.

The following description relates to a method and system which enables learning of facial artifacts on-the-fly to infer, or determine, facial emotion.

According to an aspect of the disclosure, a method for determining facial emotions of a user in the presence of facial artifacts includes detecting Action Units (AUs) for first set of frames with the facial artifacts, analyzing AUs with the facial artifacts after the detection, registering the analyzed AUs for a neutral facial expression with the facial artifacts in the first set of frames, predicting the AUs in second set of frames after the first set of frames, and determining the facial emotions by comparing the registered neutral facial expression with the predicted AUs in the second set of frames.

According to an aspect of the disclosure, a computer program product for determining facial emotions of a user in the presence of facial artifacts includes an integrated circuit further including at least one processor, at least one memory having a computer program code within the circuit, the at least one memory and the computer program code configured to, with the at least one processor cause the product to detecting Action Units (AUs) for first set of frames with the facial artifacts, analyzing the AUs with the facial artifacts after the detection, registering the analyzed AUs for a neutral facial expression with the facial artifacts in the first set of frames, predicting the AUs in second set of frames after the first set of frames, and determining the facial emotions by comparing the registered neutral facial expression with the predicted AUs in the second set of frames.

According to an aspect of the disclosure, a device for determining facial emotions of a user in the presence of facial artifacts includes an integrated circuit further including at least one processor, at least one memory having a computer program code within the circuit, the at least one memory and the computer program code configured to, with the at least one processor cause the device to detect Action Units (AUs) for first set of frames with the facial artifacts, analyze the AUs with the facial artifacts after the detection, register the analyzed AUs for a neutral facial expression with the facial artifacts in the first set of frames, predict the AUs in second set of frames after the first set of frames, and determine the facial emotions by comparing the registered neutral facial expression with the predicted AUs in the second set of frames.

According to an aspect of the disclosure, a method for determining a facial expression may include extracting neutral features from a normalized neutral facial image as a neutral feature vector; predicting neutral Action Units based on the neutral feature vector; identifying a facial artifact in the predicted neutral Action Units; assigning a reduced weight to a neutral Action Unit containing an identified facial artifact; registering the weighted neutral Action Units as a neutral facial expression; extracting features from a normalized facial image as a feature vector; predicting Action Units based on the feature vector; and determining the facial expression based on the predicted Action Units and the registered neutral facial expression.

According to an aspect of the disclosure, a method for recognizing an emotion based on a facial expression, the method may include registering a neutral facial expression including a first set of Action Units including weights based on facial artifacts identified in the neutral facial expression; determining, by a processor, a facial expression based on a second set of Action Units and the registered neutral facial expression; and recognizing the emotion based on the determined facial expression.

A weight of an Action Unit with a facial artifact may be reduced relative to a weight of an Action Unit with no facial artifact.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

This disclosure is illustrated in the accompanying drawings, throughout which like reference numerals indicate corresponding parts in the various figures. The embodiments herein will be better understood from the following description with reference to the drawings, in which.

DETAILED DESCRIPTION

Figure 1:
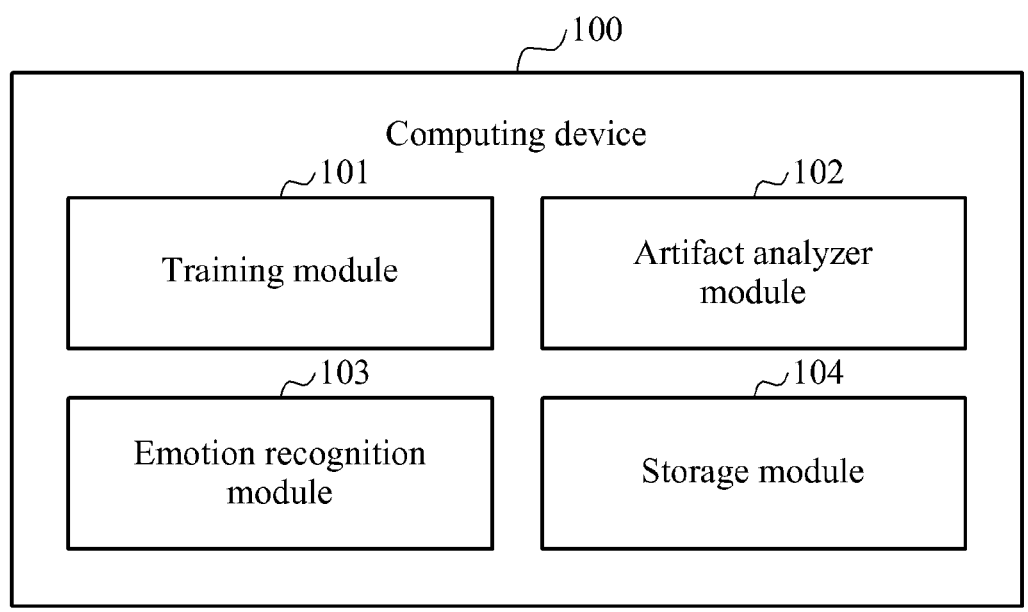
FIG. 1 illustrates a general block diagram of a computing device, according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The embodiments herein achieve a method and a system to recognize facial emotions in presence of facial artifacts using an artifact analyzer which learns about the user's neutral facial expression in presence of facial artifacts, detects AUs in the neutral facial expression, registers these detected AUs, and intelligently mitigates weights of these AUs while mapping predicted AUs to corresponding emotions.

Throughout the description, the terms facial artifacts, facial biases, and occlusions are used interchangeably.

Referring now to the drawings, and more particularly to FIGS. 1 through 4, where similar reference characters denote corresponding features consistently throughout the figures, preferred embodiments are described.

FIG. 1 illustrates a general block diagram of a computing device, according to embodiments as disclosed herein. As depicted in the figure, a computing device 100 includes a training module 101, an artifact analyzer module 102, an emotion recognition module 103, and a storage module 104.

The training module 101 trains the classifier based on the frame level and temporal level features. In an embodiment, the classifier may be a Support Vector Machine (SVM), for example. The training module 101 has a database of facial images with training data of Action Units (AUs), a standard face detection module with a version of an Active Appearance Model (AAM) based method to identify a face and pupils in every frame of the video to normalize the faces to uniform sizes, a feature extractor such as Gabor filter or Gaussian filter, for example, to extract features from the cropped face, and an SVM classifier training module to train SVM classifier to help in the prediction of AUs.

The artifact analyzer module 102 analyzes facial artifacts present in a face, and registers them for a neutral facial expression. Accordingly, AUs containing artifacts are tagged and their weights are reduced before sending the AUs to the emotion recognition module 103, which maps predicted AUs to corresponding emotions. The storage module 104 stores the trained database that can be accessed during the real-time estimation of emotions. The storage module 104 can be an internal memory such as Random Access Memory (RAM), Read Only Memory (ROM), or external memory such as memory chips, for example. In an embodiment, the storage module 104 may store the trained model in a file format. In an embodiment, the computing device 100 may be a personal computer, mobile phone, or Personal Digital Assistant (PDA), for example.

Figure 2:
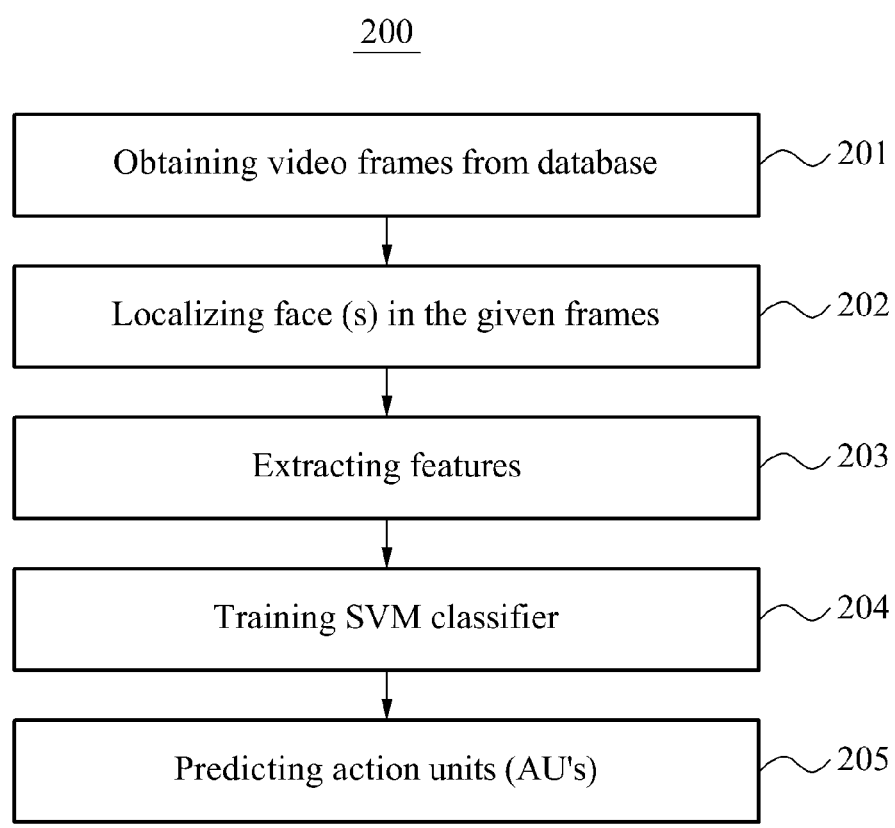
FIG. 2 illustrates a detailed flow diagram of the training phase of emotion recognition, according to embodiments as disclosed herein.

FIG. 2 illustrates a detailed flow diagram of the training phase of emotion recognition, according to embodiments as disclosed herein. As depicted in the training phase 200, the method trains a classifier to recognize the emotions of a user in real-time. For example, the method trains a SVM classifier in the training phase of emotion recognition. The method obtains the video frames from a database in operation 201. The database contains several images from many posers. The peak expression for each image is fully labeled for emotions and action units (AU). The AU labeling is based on facial action coding system (FACS) where these AUs are the fundamental actions of individual muscles or groups of muscles. For example, the action unit for the inner brow raiser is AU 1.

The method localizes the face(s) in the video frame by localizing the pupil positions in each of the identified faces in operation 202. In an embodiment, the method uses a standard face detector and a version of Active Appearance Model (AAM) based method to identify a face and pupils in every frame of the video to normalize the faces to uniform sizes. Further, the method extracts features from the cropped face by applying filter banks and constructs a feature vector in operation 203. The feature vector may be large. In an embodiment, the method extracts features using a Gabor filter and Gaussian filter, for example.

Once the relevant features are extracted, the method trains the SVM on the frame level data in operation 204. The method uses support vectors (SV) to measure the confidence level. The support vectors are important components of the SVM classifier. By this SV, the method generates the confidence level of the classification. Further, the method derives temporal features of the action units by utilizing the knowledge of its response to the frame level classifiers using SV. This temporal feature classifies the subtle AUs correctly, which the frame level classifier may potentially miss.

Feature extraction is performed in the frames from neutral to peak expression. The method trains the SVM based on derived temporal features. It is similar to the frame level training, except the temporal features are derived based on previously trained frame level classifiers. The method further stores the trained SVM classifier. The trained data is stored and available for a testing phase to determine with a detected face. Based on the trained SVM classifier, the method predicts the action units (AUs) in operation 205. The various actions in method 200 may be performed in the order presented, in a different order, or simultaneously. Further, in some embodiments, some actions listed in FIG. 2 may be omitted.

Figure 3:
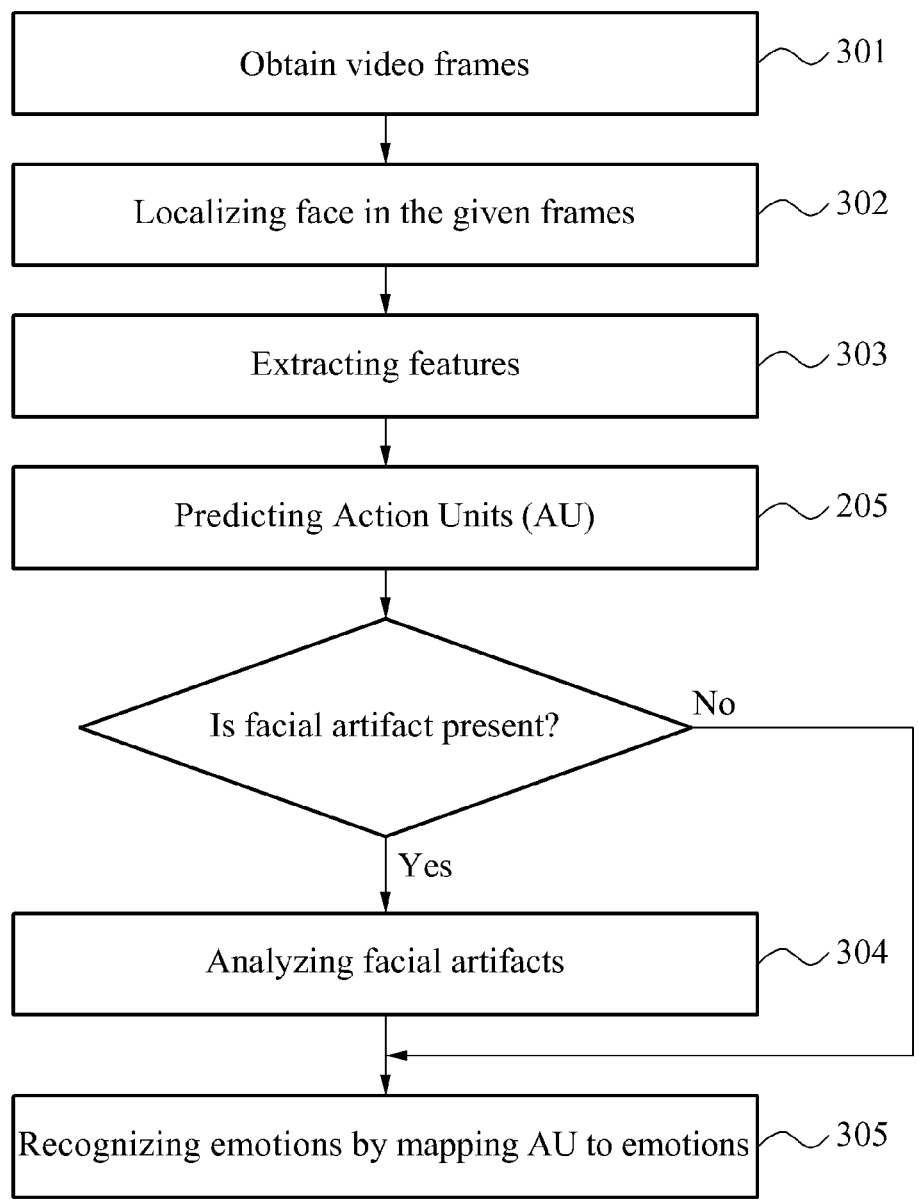
FIG. 3 illustrates a detailed flow diagram of the testing phase of emotion recognition process, according to embodiments as disclosed herein.

FIG. 3 illustrates a detailed flow diagram of the testing phase of emotion recognition process, according to embodiments as disclosed herein. As depicted in testing phase 300, the method recognizes the facial artifacts of a user, registers corresponding AUs as a neutral state, and mitigates a contribution of these AUs which may be affected by these facial artifacts, to determine accurate emotions in the presence of facial artifacts. The method obtains video frames of the user whose facial emotions are to be recognized in operation 301. For each frame, the standard face detection process is applied, which localizes a face in each frame and normalizes it in operation 302. In an embodiment, the frames may be sequence of frames in a video.

The method extracts features from the cropped face by applying filter banks and constructs a feature vector in operation 303. In an embodiment, the method extracts features using a Gabor filter and Gaussian filter. Based on the trained SVM classifier, the method predicts the AUs in the prediction module in operation 205. This data related with predicted AUs is provided to the artifact analyzer module 102, as well as to the emotion recognition module 103.

The artifact analyzer module 102, using the first set of frames, assumes that a user has a neutral facial expression, and analyzes facial artifacts present in a face, if there are facial artifacts in the first set of frames in operation 304. Then, the artifact analyzer module 102 registers them for a neutral facial expression. The user is explicitly asked to show a neutral facial expression during these first set of frames. Data corresponding to neutrality of user's facial expression may be captured by various modules such as an eye glass detection module, or facial hair detection module, for example. Accordingly, corresponding AUs with artifacts are tagged and their weights are reduced before sending the AUs to the emotion recognition module 103. The first set of frames corresponds to the first few frames in the video.

For example, an eyeglass detection module may be used to detect the presence of eyeglasses using the existing AU detection framework in the prediction module, while a facial hair detection module detects the presence of facial hair such as a beard, a mustache, or hair partially obscuring the face, for example, using the existing framework of AU detection.

After the first set of frames is used to register a neutral facial expression, the second set of frames are obtained and processed, to predict AUs corresponding to these frames. If artifact AUs are the only AUs detected in these second set of frames, the emotion recognition module 103 recognizes the state and marks it as a neutral state. Otherwise, if the method detects variations in AUs of the second set of frames and the artifact AUs, which are registered indicating to a neutral state, the weights of the artifacts AUs are mitigated from predicted AUs and an emotion is determined using the remaining predicted AUs in operation 305.

The second set of frames refers to subsequent frames in the video, after the first set of frames in the video. However, the disclosure is not limited to a second set of frames subsequent to the first set of frames. For example, the second set may appear earlier than the first set in a video, but may be provided after the first set of frames in the testing phase. Thus, the method maps the predicted AUs received from the prediction module to corresponding emotions, by taking into consideration artifact AUs registered in the artifact analyzer module 102. For example, eyeglasses nullify AU 9's contribution, so this should be eliminated while determining emotion, to avoid determining a false emotion. The various actions in method 300 may be performed in the order presented, in a different order, or simultaneously. Further, in some embodiments, some actions listed in FIG. 3 may be omitted.

In an embodiment, a method applies on-the-fly learning of facial biases and generates a reliability metric on selected Action Units (AU). This allows a successive classification engine to rely on those Action Units which are not significantly affected by present facial artifacts. This may also help the robustness of an emotion recognition engine when presented with images from different camera positions. For example, the emotion recognition system may be implemented in a user phone. Usually the user holds the phone at a lower angle while accessing the phone. In this case, the frames captured by the camera may show the eyelids in a closed position, which the existing system falsely detects as a sleepy facial expression. The proposed method learns about a user's neutral facial expression by capturing the user's frequently occurring AUs or most dominant AUs, determines the eyes closed position as a neutral facial expression, and registers it as a neutral state and determines this detected position of eyes closed as a neutral state. Thus, the method detects the neutral state in the presence of facial artifacts by analyzing frequently occurring Action Units over a period of time, thereby alleviating the need to show a neutral facial expression in the starting frames.

In an embodiment, if the method detects a non-registered facial expression frequently over a period of time, the method may proactively ask a user of the device if he wishes to re-register his facial expression.

In an embodiment, Action Units (AUs) may be learned over a period of a time for different camera positions using a phone's accelerometer information, for example.

In an embodiment, the robust emotion recognition method may handle wrinkles, birthmarks, subtle expressions, head pose, talking faces, illumination conditions, and occlusions or facial artifacts such as eyeglasses, a beard, a mustache, scars, or viewing angles, for example.

The method may be used in various applications such as emotion tagging applications where multimedia content captured may be tagged with emotions. It may be used in mobile device unlock mechanism where the registered emotion may be used as soft biometric to unlock the mobile device. The method may also be used in an Interactive Voice Response (IVR) system by virtual agents where the virtual agents interact with a user based on user's emotions.

An eBook reading application may enable automatic 'zoom in' or 'zoom out' of the eBook content based on a user's facial expressions. If a user with narrow eyes uses the eBook application, the existing facial expression recognition methods may interpret the expression as a narrowed eyes position and automatically 'zoom in' to the eBook content. The proposed method detects narrow eyes, and if a user registers a neutral facial expression, then the eBook application will not 'zoom in' unnecessarily, offering a better user experience.

Figure 4:
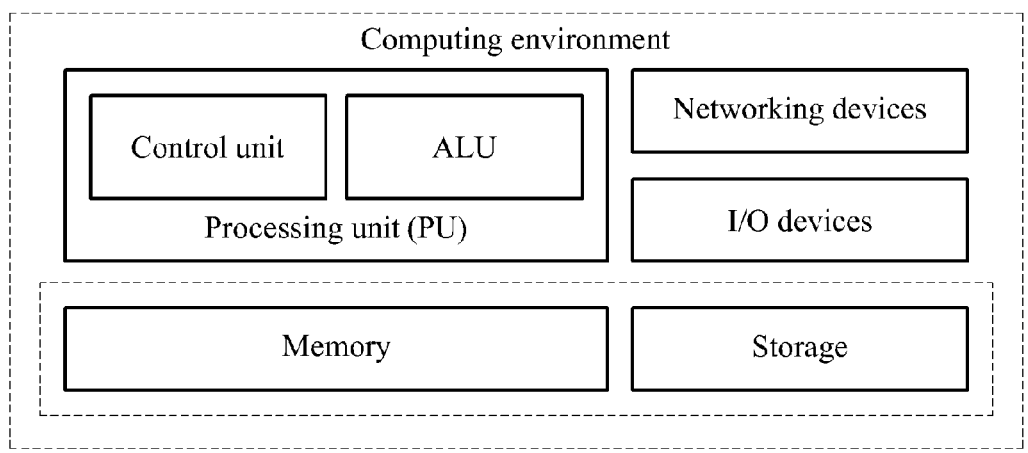
FIG. 4 illustrates a computing environment implementing the application, according to embodiments disclosed herein.

FIG. 4 illustrates a computing environment implementing the application, according to embodiments disclosed herein. As depicted, the computing environment includes at least one processing unit that is equipped with a control unit and an Arithmetic Logic Unit (ALU), a memory, a storage unit, a plurality of networking devices, and a plurality of Input output (I/O) devices. The processing unit is responsible for processing the instructions of the algorithm. The processing unit receives commands from the control unit in order to perform its processing. Further, any logical and arithmetic operations involved in the execution of the instructions are computed with the help of the ALU.

The overall computing environment may be composed of multiple homogeneous and/or heterogeneous cores, multiple CPUs of different kinds, special media, and other accelerators. The processing unit is responsible for processing the instructions of the algorithm. The processing unit receives commands from the control unit in order to perform its processing. Further, any logical and arithmetic operations involved in the execution of the instructions are computed with the help of the ALU. Further, the plurality of process units may be located on a single chip or across multiple chips.

The algorithm including instructions and codes required for the implementation are stored in either the memory unit or the storage or both. At the time of execution, the instructions may be fetched from the corresponding memory and/or storage, and executed by the processing unit.

In case of any hardware implementations, various networking devices or external I/O devices may be connected to the computing environment to support the implementation through the networking unit and the I/O device unit.

The embodiments disclosed herein may be implemented through at least one software program running on at least one hardware device and performing network management functions to control the elements. The elements shown in FIGS. 1 and 4 include blocks which may be at least one of a hardware device, or a combination of a hardware device and a software module.

The above-described embodiments may be recorded in computer-readable media including program instructions to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The above-described devices may be configured to act as one or more software modules in order to perform the operations of the above-described embodiments, or vice versa.

The foregoing description of specific embodiments provides the general nature of the embodiments herein that others can, by applying current knowledge, readily modify and/or adapt for various applications without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A computer-implemented method for determining a facial emotion, in a video comprising a face with a facial artifact, the method comprising:
   detecting Action Units (AUs) in a first set of frames of the video, wherein the first set of frames of the video comprises the face with the facial artifact, and wherein each AU comprises a fundamental action of an individual muscle or group of muscles;
   analyzing the AUs of the first set of frames of the video, wherein analyzing the AUs comprises:
      determining frequently occurring AUs that appear in a larger subset of a sequence of frames of the video than other AUs, and
      registering the frequently occurring AUs as a neutral facial expression;
   registering, as the neutral facial expression, the analyzed AUs in the first set of frames of the video;
   predicting AUs in a second set of frames of the video; and
   determining the facial emotion, by comparing: the AUs in the registered neutral facial expression in the first set of frames of the video, with the predicted AUs in the second set of frames of the video.

2. The method of claim 1, wherein registering, as the neutral facial expression, the analyzed AUs comprises:
   assuming that the face in the video shows the neutral facial expression in the first set of frames of the video.

3. The method of claim 1, wherein detecting the AUs further comprises:
   localizing the face in the video; and
   extracting features of the localized face.

4. The method of claim 1, wherein a weight of an AU with a facial artifact is reduced, if variations are detected in an AU of the second set of frames of the video and in the AU in the first set of frames of the video.

5. A non-transitory computer-readable recording medium storing a program that, when executed by a computer, implements the method of claim 1.

6. A computing device for determining a facial emotion, in a video comprising a face with a facial artifact, the computing device comprising:
   a processor configured to:
      detect Action Units (AUs) in a first set of frames of the video, wherein the first set of frames of the video comprises the face with the facial artifact, and wherein each AU comprises a fundamental action of an individual muscle or group of muscles;
      analyze the AUs to determine frequently occurring AUs that appear in a larger subset of the first set of frames of the video than other AUs; register, as a neutral facial expression, the frequently occurring AUs that appear in a larger subset of the first set of frames of the video than other AUs;
      predict the AUs in a second set of frames of the video; and
      determine the facial emotion, by comparing: the registered AUs of the neutral facial expression in the first set of frames of the video, with the predicted AUs in the second set of frames of the video; and
   an application unit configured to perform an action based on the determined facial emotion.

7. A computing device for determining a facial emotion, in a video comprising a face with a facial artifact, the computing device comprising:
- a processor; and
- a memory having instructions stored thereon executed by the processor to perform;
    - detecting Action Units (AUs) in a first set of frames of the video, wherein the first set of frames of the video comprises the face with the facial artifact, and wherein each AU comprises a fundamental action of an individual muscle or group of muscles;
    - determining frequently occurring AUs that appear in a larger subset of the first set of frames of the video than other AUs, and registering, as a neutral facial expression, the frequently occurring AUs of the first set of frames of the video; and
    - predicting the AUs in a second set of frames of the video, and determining the facial emotion, by comparing:
    - the registered AUs of the neutral facial expression in the first set of frames of the video, with the predicted AUs in the second set of frames of the video.

8. The computing device of claim 7, wherein the computing device is configured to register the AUs of the neutral facial expression, by assuming that the face in the video shows the neutral facial expression in the first set of frames of the video.

9. The computing device of claim 7, wherein the computing device is configured to detect the AUs by localizing the face in the video, and extracting features of the localized face.

10. The computing device of claim 7, wherein a weight of an AU with a facial artifact is reduced.

11. The computing device of claim 7, wherein a non-transitory storage medium is configured to store a trained database that is accessible during real-time estimation of the facial emotion.

12. The computing device of claim 7, further comprises:
- a database of facial images with training data of AUs;
- a face detector with a version of an Active Appearance Module;
- a feature extractor; and
- a Support Vector Machine (SVM) classifier training processor.

13. A computer-implemented method for determining a facial expression, the method comprising:
- extracting, as a neutral feature vector, frequently occurring neutral features from a normalized neutral facial image that appear in a larger subset of a sequence of frames of a video than other neutral features, and registering, as a neutral facial expression, the frequently occurring neutral features;
- predicting neutral Action Units based on the neutral feature vector, wherein each Action Unit comprises a fundamental action of an individual muscle or group of muscles;
- identifying a facial artifact in the predicted neutral Action Units;
- assigning a reduced weight to a neutral Action Unit containing the identified facial artifact;
- registering, as the neutral facial expression, the reduced weighted neutral Action Unit;
- extracting, as a feature vector, features from a normalized facial image;
- predicting Action Units based on the feature vector; and
- determining the facial expression based on the predicted Action Units and the registered Action Units of the neutral facial expression.

14. A computer-implemented method for recognizing an emotion based on a facial expression, the method comprising:
- registering a neutral facial expression, comprising a first set of Action Units that appear in a larger subset of a sequence of frames of a video than other Action Units, and comprising weights based on facial artifacts identified in the neutral facial expression, wherein each Action Unit comprises a fundamental action of an individual muscle or group of muscles;
- determining, by a processor, a facial expression based on a second set of Action Units and the registered first set of Action Units for the neutral facial expression; and
- recognizing the emotion based on the determined facial expression.

15. The method of claim 14, wherein a weight of an Action Unit with a facial artifact is reduced, relative to a weight of an Action Unit with no facial artifact.

* * * * *